(12) United States Patent
Suda et al.

(10) Patent No.: US 8,699,425 B2
(45) Date of Patent: Apr. 15, 2014

(54) RADIO BASE STATION, RADIO TERMINAL AND RADIO COMMUNICATION METHOD

(75) Inventors: Kenji Suda, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1029 days.

(21) Appl. No.: 12/277,548

(22) Filed: Nov. 25, 2008

(65) Prior Publication Data

US 2009/0232122 A1 Sep. 17, 2009

(30) Foreign Application Priority Data

Mar. 12, 2008 (JP) ................................. 2008-063178

(51) Int. Cl.
*H04W 4/00* (2009.01)
*H04J 3/00* (2006.01)

(52) U.S. Cl.
USPC .......................................... 370/329; 370/345

(58) Field of Classification Search
CPC ....... H04W 4/00; H04W 72/04; H04W 88/08; H04W 76/00
USPC .................................................. 370/310–350
See application file for complete search history.

(56) References Cited

U.S. PATENT DOCUMENTS

| | | | |
|---|---|---|---|
| 6,400,699 B1 * | 6/2002 | Airy et al. ...................... | 370/329 |
| 7,639,660 B2 * | 12/2009 | Kim et al. ...................... | 370/343 |
| 7,720,034 B2 * | 5/2010 | Seo et al. ....................... | 370/336 |
| 2003/0185310 A1 | 10/2003 | Ketchum et al. | |
| 2004/0162021 A1 * | 8/2004 | Seki et al. ........................ | 455/39 |
| 2005/0101259 A1 | 5/2005 | Tong et al. | |
| 2008/0025319 A1 * | 1/2008 | Veerapuneni et al. ... | 370/395.52 |
| 2008/0318606 A1 * | 12/2008 | Tsutsui et al. ................. | 455/500 |
| 2010/0046445 A1 * | 2/2010 | Sawahashi et al. ........... | 370/329 |
| 2010/0138715 A1 * | 6/2010 | Motoyoshi ..................... | 714/749 |
| 2010/0260118 A1 * | 10/2010 | Taoka et al. .................... | 370/329 |
| 2011/0158195 A1 | 6/2011 | Toda et al. | |

FOREIGN PATENT DOCUMENTS

| | | |
|---|---|---|
| EP | 1 353 452 | 10/2003 |
| JP | 2005-522086 | 7/2005 |
| JP | 2006-238314 | 9/2006 |
| WO | 2007/020995 | 2/2007 |
| WO | 2008/009157 | 1/2008 |

OTHER PUBLICATIONS

European Search Report dated Dec. 1, 2009, from the corresponding European Application.
3GPP TSG RAN WG1 49bis R1-072843, 3rd Generation Partnership Project, retrieved from http://www.3gpp.org/ftp/tsg_ran/WG1_RL1/TSGR1_49b/Docs, Jun. 2007.
Notification of Reason(s) for Refusal mailed Apr. 24, 2012, from corresponding Japanese Application No. 2008-063178.
Korean Notice of Preliminary Rejection dated Jun. 20, 2011, from corresponding Korean Application No. 10-2008-130342.

* cited by examiner

*Primary Examiner* — Warner Wong
(74) *Attorney, Agent, or Firm* — Katten Muchin Roseman LLP

(57) ABSTRACT

Data that is to be transmitted from transmitting antennas in each of a plurality of resource blocks, obtained by dividing a radio resource, used for communication with a radio terminal is multiplied by weight information. A group of plural pieces of the weight information associated with resource blocks to be transmitted per unit time is controlled.

18 Claims, 13 Drawing Sheets

FIG. 2

| | Field |
|---|---|
| Cat. 1 (Resource indication) | ID (UE or group specific) |
| | Resource assignment & Duration of assignment |
| | Multi-antenna related information |
| Cat. 2 (transport format) | Modulation scheme |
| | Payload size |
| Cat. 3 (HARQ) | Hybrid ARQ process number |
| | Redundancy version |
| | New data indicator |

RADIO BASE STATION, RADIO TERMINAL AND RADIO COMMUNICATION METHOD

CROSS-REFERENCE TO RELATED APPLICATION(S)

This application is based upon and claims the benefit of priority of the prior Japanese Application No. 2008-63178 filed on Mar. 12, 2008 in Japan, the entire contents of which are hereby incorporated by reference.

BACKGROUND

1. Field

The embodiment(s) discussed herein is directed to a radio base station, a radio terminal and a radio communication method. For examples, the embodiment(s) may be applied to a pre-coding MIMO (Multiple Input Multiple Output) transmission method.

2. Description of the Related Art

MIMO transmission method is one of radio communication techniques that are discussed as LTE (Long Term Evolution) in 3GPP (3rd Generation Partnership Project).

As techniques relating to the MIMO transmission method, one is disclosed in Patent Document 1 below, for example. Patent Document 1 discloses a method of determining a range of wireless resource groups to be allocated for communication according to long-term quality to limit the range of the wireless resource groups, reducing the information quantity of control information when the wireless resource to be used in actual communication is designated, thereby to suppress degradation of the transmission efficiency.

There is pre-coding MIMO transmission method (refer to non-patent document 1 below) as another one of the MIMO transmission methods. In this pre-coding transmission method, the transmission side multiplies a modulation signal by a predetermined weighting factor (weight information) according to known transmission path information, and performs transmission.

Patent Document 2 below discloses a method for use in an MIMO communication system of coding data in accordance with one or more pre-coding schemes, modulating the data, pre-coding modulation symbols on the basis of an equivalent channel response to pre-condition the same, for example. According to this technique, the number of transmission streams and the transmission beams in the MIMO are switched according to the communication environments to optimize the beam forming and the throughput.

[Patent Document 1] Japanese Laid-Open Patent Publication No. 2006-238314

[Patent Document 2] Published Japanese Translation of PCT International Publication for Patent Applications No. 2005-522086

[Non-Patent Document 1] 3GPP TSG RAN WG1 49bis "R1-072843"

In the pre-coding MIMO transmission method, the weight information used at the transmission side is notified to the reception side. In such case, if all the weight information is transmitted, the data transmission efficiency can be reduced. The known techniques do not give any attention to this drawback.

SUMMARY

For example, exemplary embodiment(s) uses the following.

(1) According to an exemplary embodiment, there is provided a radio base station having radio communication with a radio terminal via a plurality of transmitting antennas, the radio base station comprising a transmitter that multiplies data to be transmitted from the transmitting antennas in each of a plurality of resource blocks obtained by dividing a radio resource used for communication with the radio terminal by a piece of weight information, and a controller that controls a group of plural pieces of the weight information associated with resource blocks to be transmitted in a unit time period.

(2) The controller may select other pieces of the weight information associated with resource blocks as the group in each of the unit time period.

(3) The controller may select plural pieces of the weight information forming the group according to a predetermined rule.

(4) The controller may select plural pieces of the weight information as the group in each of the unit time period when the number of times the weight information is updated according to propagation path environments between the radio base station and the radio terminal or a ratio of updated weight information is below a predetermined threshold value.

(5) Alternatively, the controller may select all pieces of the weight information as the group when the number of times the weight information is updated according to propagation path environments between the radio base station and the radio terminal or a ratio of updated weight information is equal to or larger than a predetermined threshold value.

(6) Further, the controller may select all pieces of the weight information as the group when receiving a call setting request from the radio terminal.

(7) The controller may select all pieces of the weight information as the group when any one piece of the weight information is updated.

(8) The controller may notify the radio terminal of presence/absence of the update.

(9) According to an exemplary embodiment, there is provided a radio terminal receiving via a plurality of receiving antennas a signal transmitted from a radio base station via a plurality of transmitting antennas, the radio terminal comprising a demodulating and decoding unit that receives the signal containing a piece of weight information transmitted via the transmitting antennas in each of a plurality of resource blocks obtained by dividing a radio resource used for communication with the radio base station, and obtains the weight information from the received signal, a storing unit that stores each piece of the weight information associated with a relevant resource block, and an updating unit that updates a piece of the stored weight information associated with a relevant resource block corresponding to the received piece of weight information.

(10) According to an exemplary embodiment, there is provided a radio communication method in a communication system comprising a radio terminal and a radio base station communicating with the radio terminal via a plurality of transmitting antennas, the radio communication method comprising multiplying data to be transmitted via the transmitting antennas in each of a plurality of resource blocks obtained by dividing a radio resource used for communication with the radio terminal by a piece of weight information in the radio base station, and controlling a group of plural pieces of the weight information associated with resource blocks to be transmitted in a unit time period in the radio base station.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 2 is a diagram illustrating an example of signal contents transmitted over a control channel in the downlink from the BS to the UE;

DESCRIPTION OF EMBODIMENT(S)

Hereinafter, exemplary embodiments will be described with reference to accompanying drawings. The following exemplary embodiments are merely examples and do not intend to exclude various embodiments and variations to the proposed method and/or apparatus that are not specifically described herein. Rather, various embodiments or variations may be made to the embodiments (for example, by combining the exemplary embodiments) without departing from the scope and spirit of the proposed method and/or apparatus.

(b 1) Outline

A radio communication system according an example has a radio base station (BS: Base Station) with a plurality of transmitting antennas and a radio terminal (UE: User Equipment) with a plurality of receiving antennas, and performs radio communications in the pre-coding MIMO transmission method, for example. The BS can allocate a radio resource (frequency and transmission/reception timing) used for communication to the UE under the BS. The method of allocating a radio resource to the UE is called scheduling.

Figure 1:
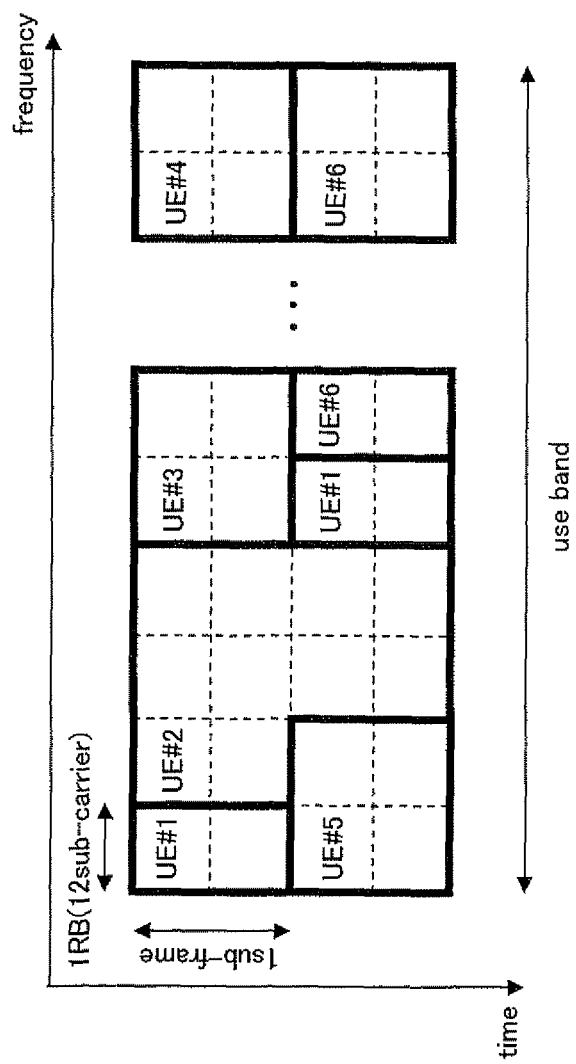
FIG. 1 is a diagram illustrating an example of scheduling of a radio resource (frequency and time) in a downlink from a radio base station (BS) to a radio terminal (UE)

FIG. 1 illustrates an example of scheduling in the down direction (downlink) from the BS to the UE. Wherein, the horizontal axis represents a frequency band (hereinafter, referred to as use band) available in the radio communication system, whereas the vertical axis represents time (timing) defined by symbol or the like. The use band may be a full frequency band available in the radio communication system or may be part of the frequency band.

The example in FIG. 1 illustrates how the radio resource (frequency and timing) is divided into a plurality of resource blocks (RB) defined by a predetermined band width and a period (time width). The scheduling (frequency-and-time scheduling) may be implemented on a per-RB basis.

In the example illustrated in FIG. 1, one RB is divided so as to have a bandwidth (180 kHz) corresponding to 12 sub-carriers and a time width equal to a half of one sub-frame. Note that this case is merely one example, the number of sub-carriers (bandwidth) and the time width per one RB can be suitably changed. For example, the bandwidth of one RB can be determined so that effects of the fading generated in the radio communication environments are flat in the use frequency band in the communication system.

The UE carries out radio communication with the BS, using one or a plurality of RBs allocated in the scheduling by the BS. In the example illustrated in FIG. 1, four RBs are allocated to UE#1, UE#3, UE#4 and UE#5, while ten RBs are allocated to each of UE#2. To one RB, data channel (data CH) used to transmit user data (including voice, character, image, moving picture, etc.) and control channel (control CH) used to transmit control information (control signal) can be allocated.

FIG. 2 illustrates an example of signal contents transmitted over the control CH in the downlink. The control signal illustrated in FIG. 2 is downlink scheduling information used by the UE to perform a receiving process on received data from the BS. Information elements of the downlink scheduling information can be collectively coded in the BS and transmitted to each UE.

As illustrated in FIG. 2, the downlink scheduling information includes, as the information elements, resource information as category 1, transport format as category 2 and field values relating to HARQ (Hybrid Automatic Repeat Request) as category 3.

For example, ID (UE or group specific) in Category 1 is information for identifying which UE (or which group to which the UE belongs) data to be transmitted is addressed to. Resource assignment & Duration of assignment is information indicating an RB (frequency and timing) allocated by the BS and to be received and demodulated by the UE.

Multi-antenna related information in Category 2 is information about multi-antenna in the MIMO transmission method or the like, which can contain weight information in the pre-coding MIMO transmission method. Modulation scheme is information indicating a modulation method such as QPSK, 16 QAM, 64 QAM or the like. Payload size is information indicating a payload size of transmission signal in the downlink (DL).

Hybrid ARQ process number in Category 3 is information indicating a process number of HARQ. Redundancy version is information for supporting the redundancy. New data indicator is information representing whether the transmission signal in the DL is new data or retransmission data.

In the pre-coding MIMO transmission, the BS generates weight information that is to be multiplied a signal to be transmitted from each transmitting antenna on the basis of information fed-back from the UE such as information about transmission path environments between the BS and the UE, information about instantaneous channel variation in each transmit antenna in the DL, information (PMI: Precoding Matrix Index) about candidates of the weight information selected on the basis of the above information and/or the like.

The BS modulates transmission data in a predetermined modulation system such as QPSK, 16 QAM, 64 QAM or the like, multiplies the modulation signal by the above generated weight information to combine (multiplex) the transmission data and the weight information, applies a predetermined radio process to the combined data, and transmits the data to the UE.

On this occasion, the BS can give the multiplied weight information (hereinafter, also referred to as antenna weight information) to the above Multi-antenna related information on the control CH and transmit the antenna weight information.

Meanwhile, the above antenna weight information can be determined (generated) according to feedback information from the UE. However, the BS does not always determine the antenna weight information in agreement with the feedback information. Therefore, the UE is desirable to be notified of the antenna weight information from the BS.

For the above reason, the BS may transmit the antenna weight information on a per-RB basis (in schedule unit of transmission data in DL).

If the antenna weight information is transmitted in each RB (every RB) within one sub-frame, it means that a considerable quantity of control information (a large number of bits) is transmitted.

Figure 3:
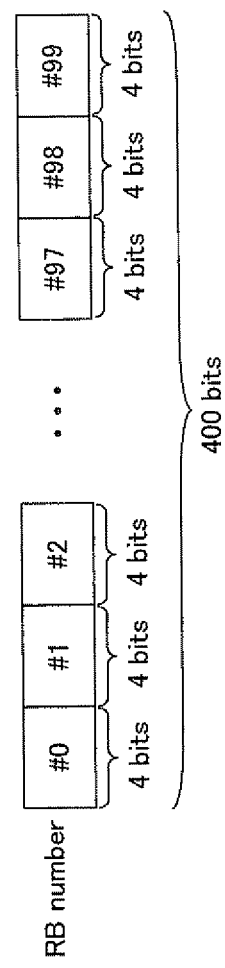
FIG. 3 is a diagram illustrating an example where antenna weight information associated with each resource block (RB) is transmitted in one sub-frame.

As illustrated in FIG. 3, when the amount of information (PMI) of the antenna weight information is four bits and the number of RBs is 100 (RB number #0 to #99) (for example, when the use band of the system is 20 MHz), the number of bits of the antenna weight information per one sub-frame amounts to 400 bits (4 bits×100=400 bits). If the amount of control information other than the antenna weight information in the scheduling information illustrated in FIG. 2 is about 60 to 70 bits, the information amount of the antenna weight information is enormous.

For this reason, the number of times of multiplexing on the control CH and the transmission efficiency (throughput) of the control information are possibly reduced.

As an example of method for reducing the transmission quantity of the antenna weight information, there could be a method of transmitting the antenna weight information (four bits per one sub-frame) common to the whole use band (all RBs). As compared with a method of transmitting the antenna weight information in each RB, the above method may cause a reduction in accuracy of the antenna weight information for each RB, which further causes coarse control on the antenna weight (degradation of the control accuracy).

The BS may map, limitedly and selectively, part of the plural pieces of the antenna weight information used for the RBs in one sub-frame (time slot), and transmit the sub-frame to the UE, for example. In other words, the BS may intermittently transmit (thin out) the antenna weight information of the RBs at a certain timing, intermittently (thinning-out). The remaining antenna weight information can be transmitted in another sub-frame. Namely, the antenna weight information of the RBs can be divided and sent in a plurality of sub-frames.

This makes it possible to reduce the transmission quantity of the antenna weight information in one sub-frame per unit time to be transmitted to the UE, which allows the BS to use the reduced information quantity to transmit another control information or control information addressed to another UE, improving the multiplexing efficiency and the transmission efficiency of the control CH.

As compared with a case where the antenna weight information common to the whole use band is transmitted in one sub-frame, the above method can finely control the antenna weight of the pre-coding MIMO on a per-RB basis, improving the receive quality at the receiver's side (UE's side).

(2) An Example of Radio Communication System (MIMO Communication System)

Hereinafter, an example of radio communication system (MIMO communication system) will be described in detail.

(2.1) First Embodiment

Figure 4:
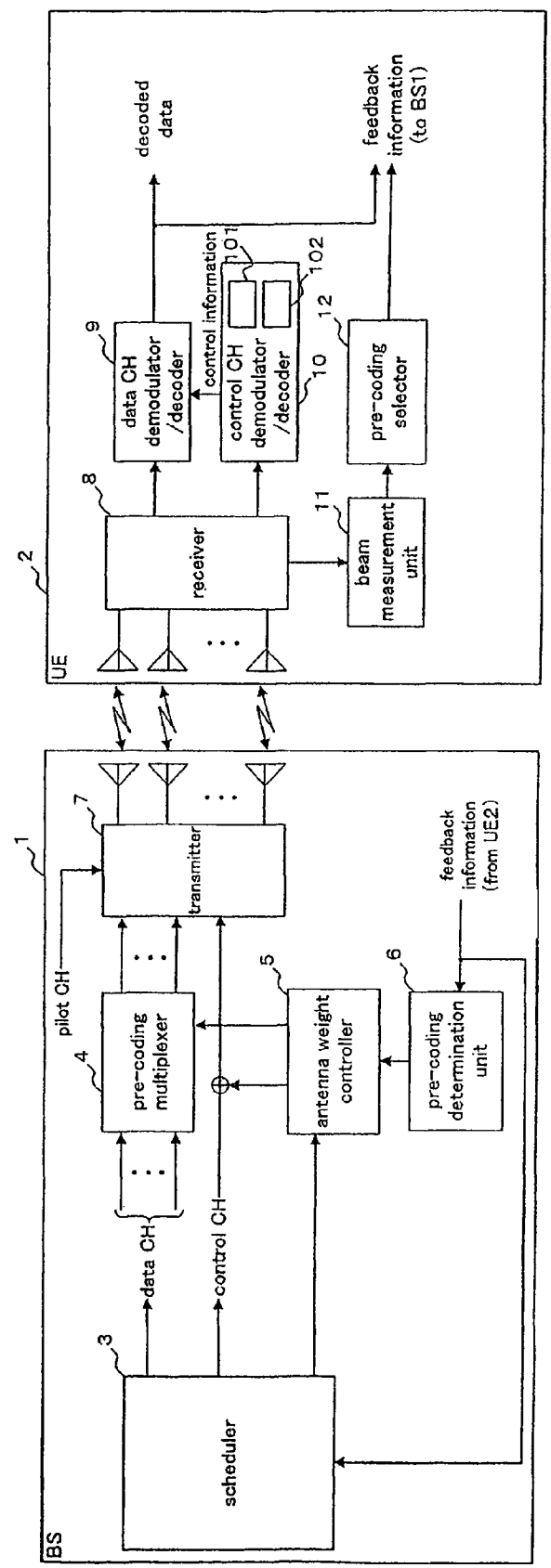
FIG. 4 is a block diagram illustrating an example of configuration of a radio communication system (MIMO communication system) according to a first embodiment.

FIG. 4 is a block diagram illustrating configuration of a radio communication system according to a first embodiment. The radio communication system illustrated in FIG. 4 has, illustratively, at least one BS 1 and at least one UE. The UE 2 can connect to the BS1 in a radio zone (cell or sector) provided by the BS1 through a radio link to communicate with the BS 1. The radio link includes a downlink (DL) in a direction from the BS 1 to the UE 2 and an uplink (UL) in the opposite direction, each of which can include a control CH and a data CH. The radio resource (frequency, timing) used by the UE 2 in the radio link can be allocated (designated) in the scheduling by the BS 1.

(As to BS 1)

From the viewpoint of a transmission function of the DL, the BS 1 has a scheduler 3, a pre-coding multiplexer 4, an antenna weight controller 5, a pre-coding determination unit 6 and a transmitter 7, for example.

The scheduler 3 has a function of scheduling the radio resource on a per-RB basis in the DL and/or UL for the UE 2 under the BS 1 (allocating to the UE 2).

The pre-coding determination unit 6 has a function of determining (generating) antenna weight information associated with each RB on the basis of feedback information from the UE 2. The determined antenna weight information (for example, PMI) is notified to the antenna weight controller 5.

The antenna weight controller (controller) 5 controls weight information to be multiplied transmission data corresponding to an RB scheduled by the scheduler 3 on the basis of the antenna weight information associated with each RB determined by the pre-coding determination unit 6.

The antenna weight controller 5 in this example schedules so that the antenna weight information associated with each RB is transmitted in a plurality of sub-frames to the UE 2, and multiplexes the antenna weight information together with another control data onto the control CH.

Namely, the antenna weight controller 5 in this example maps, limitedly and selectively, part of the antenna weight information associated with the RBs in the use band in one sub-frame, and transmits the antenna weight information to the UE 2.

In other words, the antenna weight controller 5 in this example has a function as a controller which controls a group of plural pieces of the antenna weight information associated with the respective RBs to be transmitted in one sub-frame.

The antenna weight controller 5 in this example can select different part of the antenna weight information associated with RBs in each sub-frame as the above transmission group, and transmit the selected transmission group to the UE 2.

The pre-coding multiplexer 4 has a function of multiplying the transmission data (modulation data) on the data CH modulated in a predetermined modulation system such as QPSK, 16 QAM, 64 QAM or the like by the antenna weight information given from the antenna weight controller 5 to combine (multiplex) the transmission data and the antenna weight information.

The pre-coding multiplexer 4 in this example has a function as a transmission processor which multiplies data to be transmitted from the transmitting antenna by the antenna weight information on per-RB basis, the radio resource used for the communication with the UE 2 being divided into a plurality of RBs.

The transmitter 7 has a function of transmitting a signal on the control CH and data CH. The transmitter 7 in this example has a function of multiplexing a signal (pilot signal) on a pilot channel (CH), which is a known signal, onto a transmission signal on the control CH and data CH, and a function of applying radio transmission processes such as DA conversion, frequency conversion to a radio frequency (up-conversion), power amplification and the like to the multiplexed signal, and transmitting the radio signal to the UE 2 through a plurality of transmit antennas.

In the BS 1 in this example configured as above, the antenna weight controller 5 schedules based on a predetermined scheduling setting of the antenna weight information so that part of the antenna weight information of RBs is limitedly mapped on the control CH in one sub-frame and transmitted, and the transmitter 7 transmits the control CH to the UE 2 on the basis of a result of the above scheduling.

Remaining antenna weight information not mapped on a sub-frame can be transmitted to the UE 2 in another sub-frame.

Whereby, it becomes possible to reduce the transmission quantity of the antenna weight information in one sub-frame transmitted to the UE 2, leading to improvement of the transmission efficiency of the communication system.

(As to UE 2)

The UE 2 illustrated in FIG. 4 has a receiver 8, a data CH demodulator/decoder 9, a control CH demodulator/decoder 10, a beam measurement unit 11 and a pre-coding selector 12, for example.

The receiver 8 has a function of applying radio receiving processes such as low noise amplification, frequency conversion (down conversion) to the baseband frequency, AD conversion and the like to a received signal received via a plurality of the receiving antennas.

The control CH demodulator/decoder (demodulating and decoding unit) 10 has a function of demodulating and decoding the received signal on the control CH. The control CH demodulator/decoder 10 in this example estimates the channel by means of a pilot signal obtained by the receiver 8, and demodulates and decodes the received signal on the control CH on the basis of a result of the channel estimation to obtain various control information.

The control CH demodulator/decoder 10 in this example has a function of obtaining the antenna weight information from the received signal on the control CH, and storing the antenna weight information on a per-RB basis in a memory 101, which is an example of storing unit.

Further, the control CH demodulator/decoder 10 in this example has a function as an updating unit 102 which, when receiving the antenna weight information from the BS1, updates contents in the memory 101 as to an RB associated with the received antenna information.

The data CH demodulator/decoder 9 has a function of demodulating and decoding received signals on the data CH. The data CH demodulator/decoder 9 in this example demodulates and decodes a received signal on the data CH with use of various control information obtained by the control CH demodulator/decoder 10 and a channel estimation value of the pilot signal.

Namely, the data CH demodulator/decoder 9 can use the antenna weight information stored in the memory 101 for demodulation and decode of a received signal on the data CH.

The beam measurement unit 11 has a function of measuring a receive quality such as SIR (Signal to Interface Ratio) and the like of a beam transmitted from each antenna of the BS1 on the basis of the channel estimation value of the pilot signal.

The pre-coding selector 12 has a function of selecting (determining) antenna weight information suited to reception of each RB allocated to its own station (UE) 2 on the basis of a result of beam measurement (receive quality) by the beam measurement unit 11. For example, the pre-coding selector 12 holds a code book having candidates (pre-coding matrix: PM) of antenna weight information for each RB in a memory or the like not illustrated, and selects and determines antenna weight information (index: PMI) suited to reception of an RB allocated by the BS1 from the code book. The determined information is transmitted as feedback information to the BS1 over a control CH (feedback CH) in the UL.

The code book may be beforehand notified from the BS 1 to the UE 2 over the control CH in the DL, or may be beforehand arranged between the BS 1 and the UE 2.

Which RB the received antenna information is associated with may be specified according to a transmission pattern of antenna weight information of RBs generated by the BS 1 so that the UE 2 can autonomously specify, or may be specified by notifying information relating to the transmission pattern from the BS 1 to the UE 2. Alternatively, the antenna weight information may contain information about RB to specify the RBs, as a matter of course.

As stated above, in the radio communication system in this example, the BS 1 distributes antenna weight information of the RBs to a plurality of sub-frames to be transmitted to the UE 2, whereby the transmission quantity of the antenna weight information per one sub-frame can be reduced. Accordingly, the reduced information quantity can be used for transmission of another kind of control information or for transmission of control information to another UE 2, improving the multiplexing efficiency and the transmission efficiency of the control CH.

Since the BS 1 distributes antenna weight information of the RBs to a plurality of sub-frames, the BS 1 can accumulatively receive plural pieces of feedback information before transmitting the determined (generated) antenna weight information to UE 2 according to the feedback information after receiving the feedback information received from UE 2.

Since the BS 1 can average plural pieces of feedback information from the UE2 and determine (generate) antenna weight information on the basis of a result of this averaging process, the BS 1 can provide more accurate antenna weight information to the UE 2.

(2.2) Second Embodiment

In the above-described embodiment, the BS 1 limitedly maps part of antenna weight information of the RBs onto one sub-frame and transmits the same. Alternatively, the part of antenna weight information (that is, a group of plural pieces of antenna weight information to be transmitted to the UE 2) mapped on one sub-frame may be changed per sub-frame according to a predetermined rule.

Figure 5:
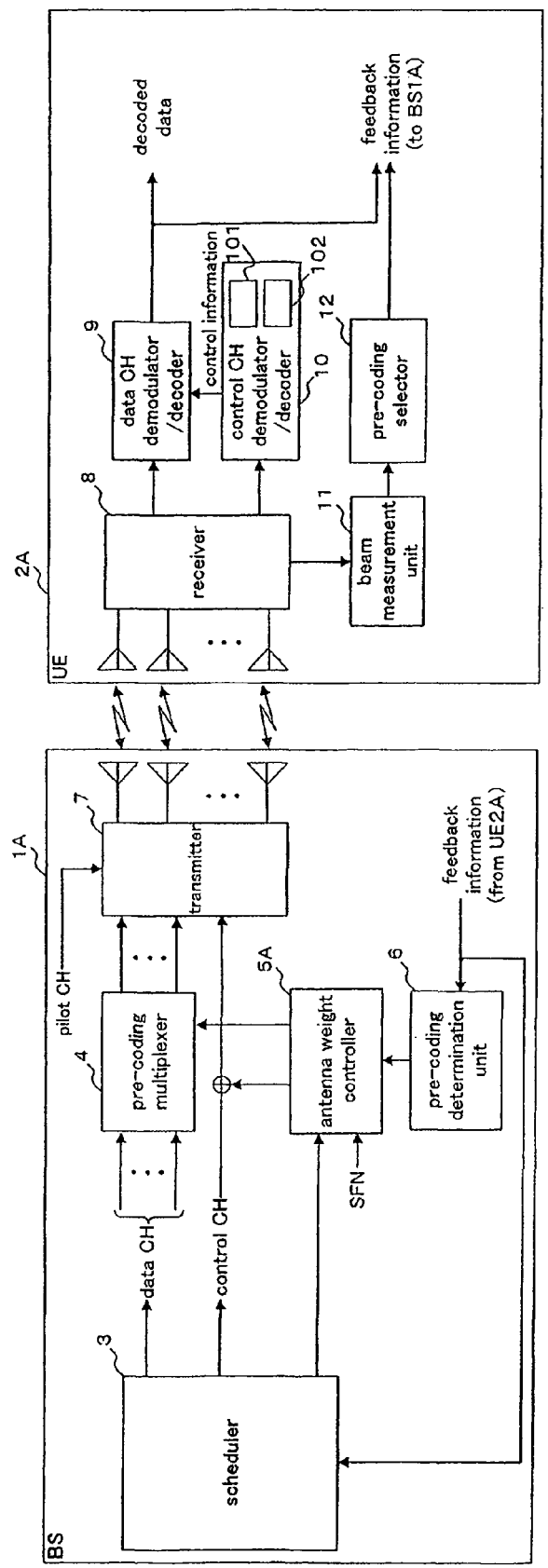
FIG. 5 is a block diagram illustrating an example of configuration of a radio communication system according to a second embodiment.

For example, an antenna weight controller 5A in this embodiment illustrated in FIG. 5 may perform scheduling of antenna weight information based on a system frame number (SFN: System Frame Number) that the UE 2A may receive from the BS 1A to recognize the system frame number. In FIG. 5, like reference characters designate like or corresponding parts that have been described hereinbefore unless specifically mentioned.

As a practical example, the antenna weight controller 5A can determine an RB with which antenna weight information is to be transmitted on the basis of the remainder yielded when SFN is divided by a constant.

Figure 6:
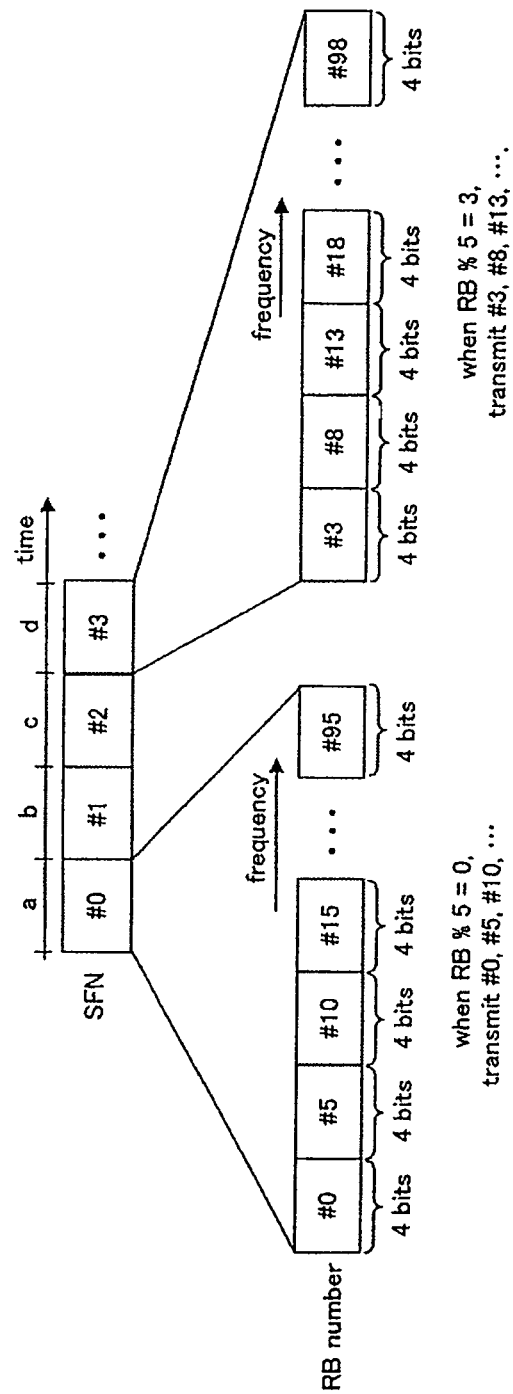
FIG. 6 is a diagram illustrating an example of operation of a BS depicted in FIG. 5.

As illustrated in FIG. 6, when processing a sub-frame having a certain sub-frame number SFN ("0" in FIG. 6, for example), the antenna weight controller 5A transmits, in this sub-frame, antenna weight information of RBs having RB numbers whose remainders, each of which is obtained by dividing its RB number by a predetermined constant ("5" in FIG. 6, for example), are equal to a value of the SFN, while not transmitting antenna weight information of the remaining RBs.

In other words, during a time period (in a sub-frame having an SFN #0) denoted by a character "a" in FIG. 6, the antenna weight controller 5A transmits antenna weight information of RBs whose remainders, each of which is yielded by dividing its RB number by a constant, are equal to the SFN (that is, RB numbers whose remainders are equal to "0" (#0, #5, #10, ... and #95)) in the sub-frame having the SFN #0, while not transmitting antenna weight information of other RBs in this sub-frame having the SFN #0.

Similarly, during a time period (in a sub-frame having an SFN #3) denoted by a character "d", for example, the antenna weight controller 5 transmits antenna weight information of RBs whose remainders, each of which is yielded by dividing its RB number by "5", are equal to the SFN (that is, equal to "3" (#3, #8, #13, ... and #98) during this time period, while not transmitting antenna weight information of the remaining RBs in this sub-frame having an SFN #3.

Whereby, the BS 1A in this example can change antenna weight information of RBs to be loaded in one sub-frame in a predetermined time cycle.

Taking into account a case where the value of SFN is equal to or larger than "5", it is alternatively possible to calculate a remainder yielded by dividing SFN by the predetermined constant ("5" in FIG. 6, for example), and compare the calculated remainder with a remainder yielded by dividing an RB number by a predetermined constant ("5" in FIG. 6, for example).

The UE 2A in this example calculates the RB number of an RB transmitted from the BS 1A on the basis of the above predetermined constant notified beforehand from the BS 1A and known SFNs.

Whereby, the UE 2A (updating unit 102) in this example can update antenna weight information (old antenna weight information) of each RB retained in the above-noted memory 101 received up to this time to antenna weight information (new antenna weight information) received from the BS 1A on a per-RB basis.

Figure 7:
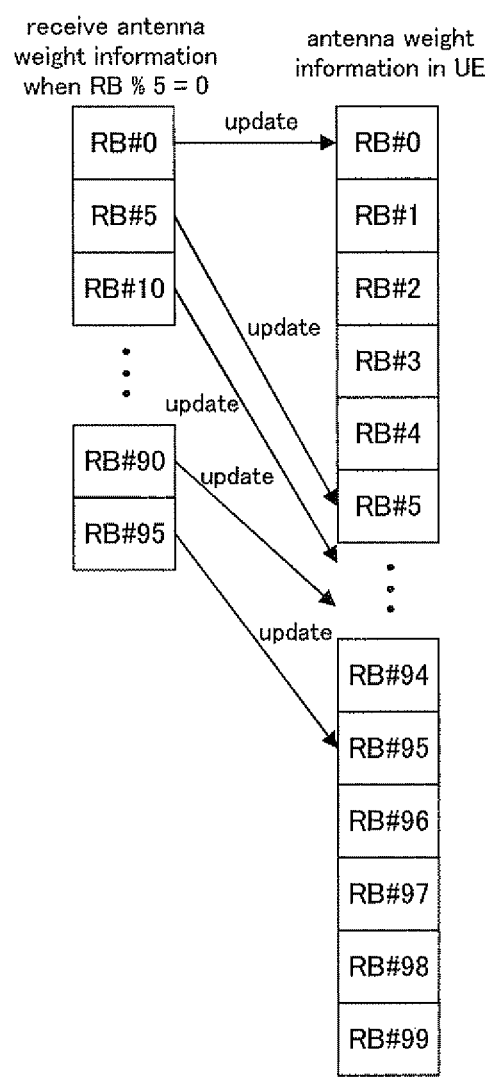
FIG. 7 is a diagram illustrating an example of operation of a UE depicted in FIG. 5.

For example, when the SFN is "0" as illustrated in FIG. 7, the UE 2A updates old antenna weight information (antenna weight information of RBs having the RB numbers "#0", "#5", "#10", ... and "#95") to new antenna weight information (antenna weight information of RBs having the RB numbers "#0", "#5", "#10", ... and "#95") received this time from the BS 1A.

Figure 8:
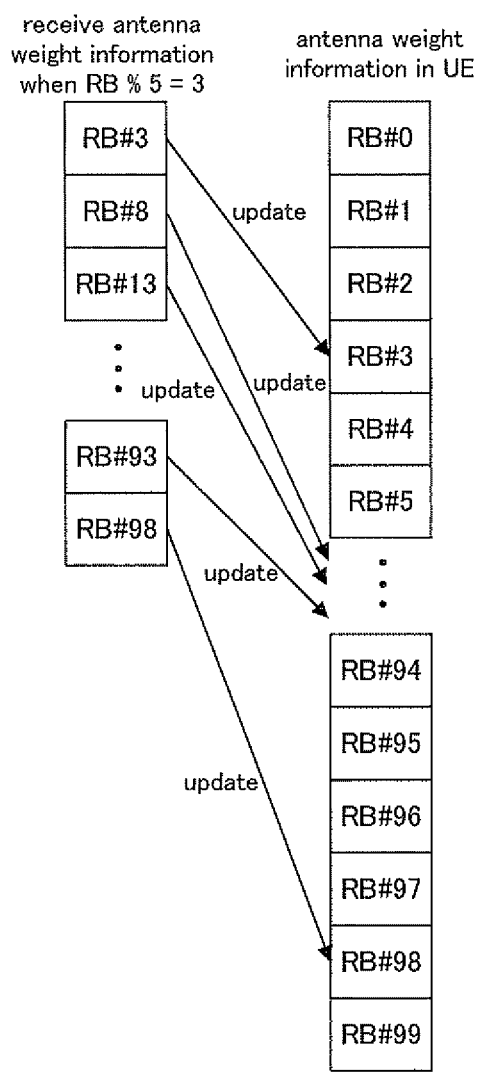
FIG. 8 is a diagram illustrating anther example of the operation of the UE depicted in FIG. 5.

When the SFN is "3" as illustrated in FIG. 8, for example, the UE 2A updates old antenna weight information (antenna weight information of RBs having the RB numbers "#3", "#8", "#13", ..., and "#98") to new antenna weight information (antenna weight information of RBs having the RB numbers "#3", "#8", "#13", ..., and "#98") received this time from the BS 1A.

As above, this embodiment makes it possible to determine, on the basis of the SFN that the UE 2A receives from the BS 1A and recognize the SFN, which sub-frame among a plurality of sub-frames antenna weight information of RBs is mapped on (which RBs in one sub-frame antenna weight information is mapped on) and transmitted. Therefore, this embodiment can provide the same effects and advantages as the above-mentioned embodiment. In addition, this embodiment allows the UE 2A to autonomously identify an RB associated with received antenna weight information with ease without receiving any special information notification from the BS 1A, and appropriately update antenna weight information of a corresponding RB.

In the above example, the predetermined constant is "5". However, this value may be appropriately changed, or information other than SFN may be employed.

Namely, the rule for determining antenna weight information of RBs to be transmitted in each sub-frame (transmission pattern of antenna weight information of RBs) is merely an example, hence may be appropriately changed. On such occasion, the rule (transmission pattern) may not fail to transmit any piece of antenna weight information of an RB, or the rule may allow the UE 2A to autonomously specify an RB associated with received antenna weight information.

(2.3) Third Embodiment

In the above example, the BS 1 thins out antenna weight information of some RBs in one sub-frame and transmits the same. Alternatively, the BS 1B can switch whether or not to thin out the antenna weight information and transmit.

Figure 9:
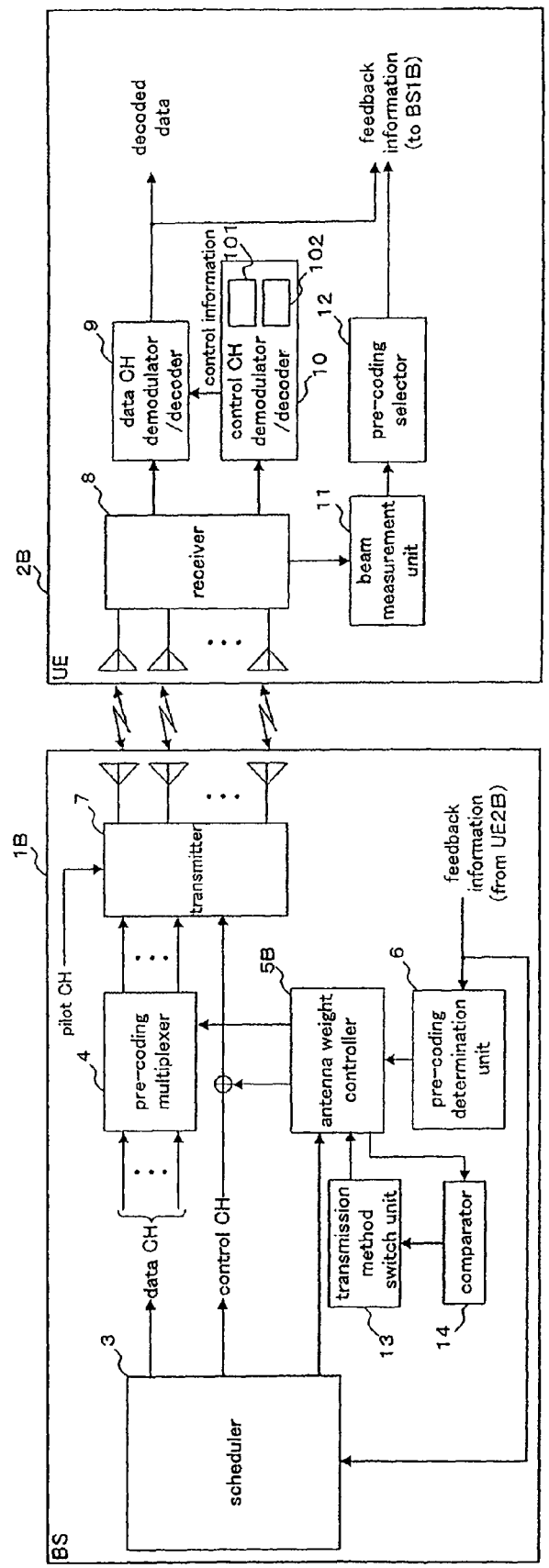
FIG. 9 is a block diagram illustrating an example of configuration of a radio communication system according to a third embodiment.

As illustrated in FIG. 9, the BS 1B in this example has a transmission method switch unit 13 and a comparator 14 in addition to the above constitutional elements described above with reference to FIG. 4 or 5. Incidentally, like reference characters in FIG. 9 designate like or corresponding parts that have been described hereinbefore unless specifically mentioned.

The transmission method switch unit 13 has a function of switching the transmission method (scheduling) of antenna weight information on the basis of a result of judgment by the comparator 14.

The comparator 14 has a function of monitoring the number of times the antenna weight controller 5B updates (changes) antenna weight information of RBs within a predetermined time period according to decision made by the pre-coding determination unit 6, or the number of RBs (ratio) whose antenna weight information is updated (or the number of transmittable RBs in one sub-frame) to the number of all the RBs in the use band, and comparing the above number of times of the update or the number of updated RBs (ratio) with a predetermined threshold value.

For example, the comparator 14 in this example compares the number of RBs (or the number of times) that the antenna weight controller 5B updates the antenna weight information with a threshold value thereof, and, when the number of RBs (or the number of times) is equal to or larger than the threshold value (for example, when there is a change in propagation environments because, for example, the UE 2B moves), directs the transmission method switch unit 13 not to thin out the antenna weight information but transmit all the antenna weight information of the RBs in one sub-frame.

On the other hand, when the number of times (or the number of RBs) the antenna weight information is updated is below the threshold value (when there is little change in propagation environments because, for example, the UE 2B does not move), the comparator 14 directs the transmission method switch unit 13 to thin out the antenna weight information of the RBs in one sub-frame and transmit the thinned-out antenna weight information.

When receiving the direction from the comparator 14, the transmission method switch unit 13 controls (switches) the scheduling method of antenna weight information by the antenna weight controller 5B so that the antenna weight information is transmitted to the UE 2B in a scheduling method in agreement with the direction.

This embodiment makes it possible to switch the transmission method between a manner of transmitting the antenna weight information in one sub-frame and a manner of dividing the antenna weight information into plural groups and transmit the antenna weight information in plural sub-frames, according to the number of times the antenna weight information is updated or the number of updated RBs, that is, according to the propagation path environments between the BS 1B and the UE 2B, thereby to flexibly control the transmission quantity of the antenna weight information per one sub-frame according to the propagation path environments. As a result, it becomes possible to suppress degradation of the receive quality at the UE 2B, while improving the multiplexing efficiency and the transmission efficiency of the control CH.

In the above example, there is described a case where the transmission method of antenna weight information is switched according to the number of times the antenna weight information is updated or the number of updated RBs. Alternatively, the constant ("5" in the example described in (2.2)) defining a pattern of antenna weight information of RBs to be transmitted described above in (2.2) may be changed according to the number of times the antenna weight information is updated or the number of updated RBs.

(2.4) Fourth Embodiment

When the UE 2C does not hold antenna weight information of all RBs, that is, when the UE 2C first connects to BS 1C and makes a call setting request therefrom, for example, the BS 1C may transmit antenna weight information of all RBs in one sub-frame collectively in order to provide the antenna weight information required by the UE 2C within a short period of time.

Figure 10:
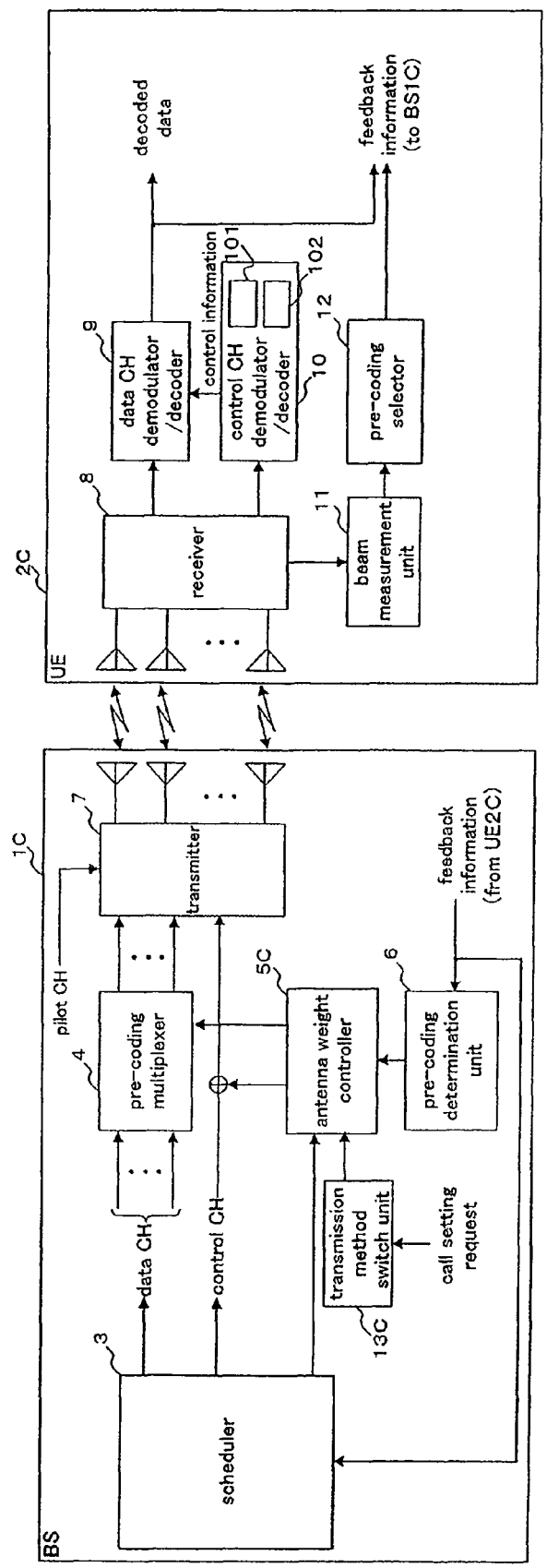
FIG. 10 is a block diagram illustrating an example of configuration of a radio communication system according to a fourth embodiment.

In such case, the BS 1C has a transmission switch section 13C which switches the antenna weight information transmission method according to whether or not the BS 1C receives a call setting request from the UE 2C, as illustrated in FIG. 10. Incidentally, like reference characters in FIG. 10 designate like or corresponding parts that have been described hereinbefore unless specifically mentioned.

When the BS 1C in this example receives a call setting request from the UE 2C, the transmission method switch unit 13C controls the antenna weight controller 5C to transmit antenna weight information of all RBs in one sub-frame. In other cases, the transmission method switch unit 13C controls the antenna weight controller 5C to divide the antenna weight information of the RBs into plural groups and transmit the antenna weight information in a plurality of sub-frames.

Namely, the BS 1C in this example transmits antenna weight information of all RBs in one sub-frame collectively when starting the communication with the UE 2C. After that, the BS 1C thins out the antenna weight information in one sub-frame and transmits the thinned-out antenna weight information to the UE 2C.

In this embodiment, the BS 1C can transmit antenna weight information of all RBs in one sub-frame collectively to the UE 2C that does not yet hold antenna weight information at the time of start of communication by the UE 2C, for example. Whereby, the UE 2C can receive and hold the antenna weight information of all RBs within a short period of time, and appropriately execute the receiving process thereafter.

(2.5) Fifth Embodiment

The BS 1D can transmit antenna weight information of all RBs in one sub-frame collectively when antenna weight information of any RB is updated, while not transmitting the antenna weight information to the UE 2D when antenna weight information of any RB is not updated.

Figure 11:
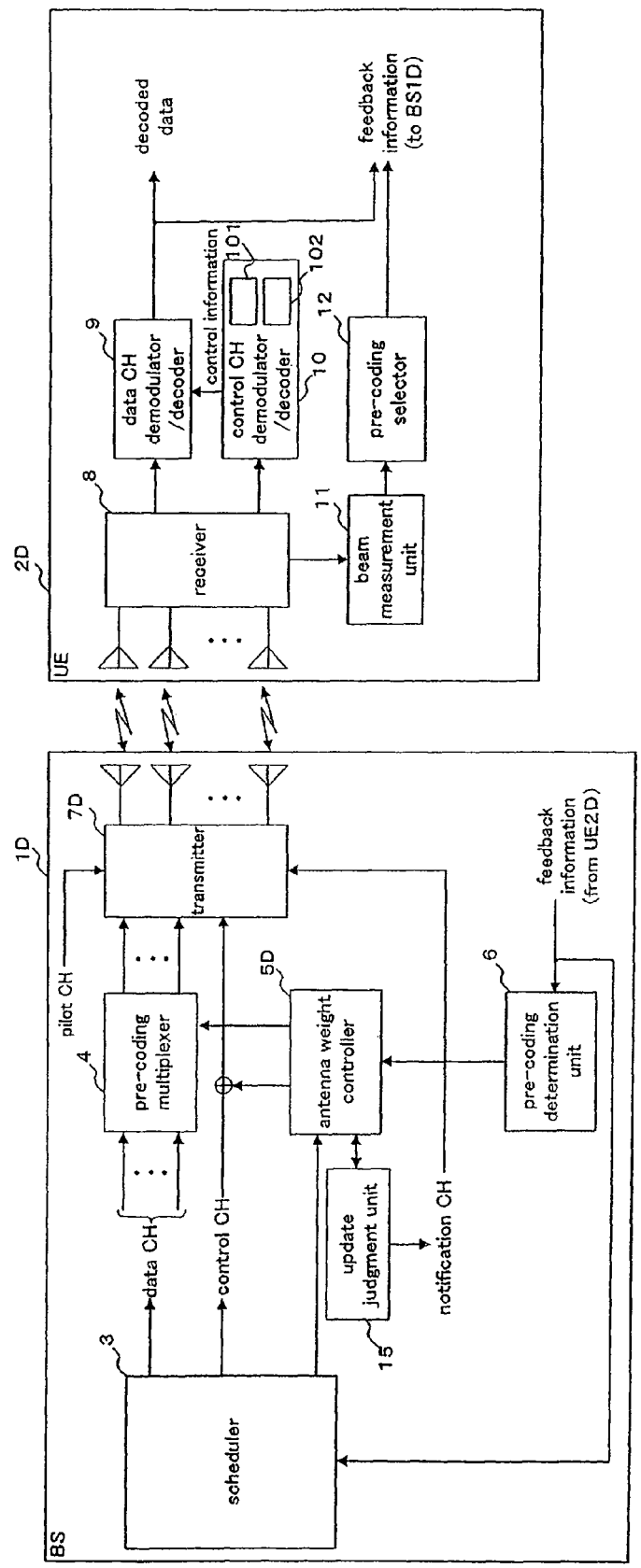
FIG. 11 is a block diagram illustrating an example of configuration of a radio communication system according to a fifth embodiment.

The BS 1D in such case has an update judgment unit 15 which monitors the antenna weight controller 5D to judge whether the antenna weight information is updated or not, as illustrated in FIG. 11. Incidentally, like reference characters in FIG. 11 designate like or corresponding parts that have been described hereinbefore unless specifically mentioned.

When any antenna weight information updated by the antenna weight controller 5D exists, the update judgment unit 15 in this example controls the antenna weight controller 5D to transmit antenna weight information of all RBs in one sub-frame to the UE 2D.

On the other hand, when no antenna weight information updated by the antenna weight information exists, the update judgment unit 15 controls the antenna weight controller 5D not to transmit antenna weight information of any RB to the UE 2D.

Further, when the antenna weight information is updated through the above operation, the update judgment unit 15 in this example notifies the UE 2D of information representing that update occurs over a notification channel (notification CH). When the antenna weight information is not updated, the update judgment unit 15 notifies the UE 2D of information representing that update does not occur. Incidentally, the notification channel may be multiplexed as a kind of the control channel by the transmitter 7 or may be multiplexed as a channel other than the control channel.

When receiving antenna weight information from the BS 1D (when receiving information representing that update occurs), the UE 2D in this example updates contents of the above-described memory 101 to antenna weight information (new antenna weight information) received from the BS 1D, and demodulates and decodes a received signal on the data CH with the new antenna weight information to obtain the same. On the other hand, when not receiving antenna weight information from the BS 1D (when receiving information representing that no update occurs), the UE 2D demodulates and decodes a received signal on the data CH with antenna weight information (old antenna weight information) already stored in the above-described memory 101 to obtain the same.

The BS 1D in this example transmits antenna weight information of RBs in one sub-frame to the UE 2D when the antenna weight information is updated, while not transmitting the antenna weight information when the antenna weight information is not updated, thereby to further reduce the transmission quantity of the antenna weight information. As a result, it becomes possible to further improve the multiplexing efficiency and the transmission efficiency of the control CH.

In the above example, the BS 1D transmits antenna weight information of all RBs in one sub-frame to the UE 2D when the antenna weight information is updated. Alternatively, the BS 1 may transmit the antenna weight information, limiting to RBs whose antenna weight information is updated, for example.

In such case, the BS 1D may include information representing which RB is updated in the information representing that update occurs, and notify the UE 2D of the information.

(2.6) Sixth Embodiment

In the above fifth embodiment, the BS 1D notifies the UE 2D of information representing whether update of antenna weight information occurs or not. Alternatively, the UE 2E may detect whether or not the antenna weight information is contained in the control CH to dispense with the above notification (setting of the notification channel), for example.

Figure 12:
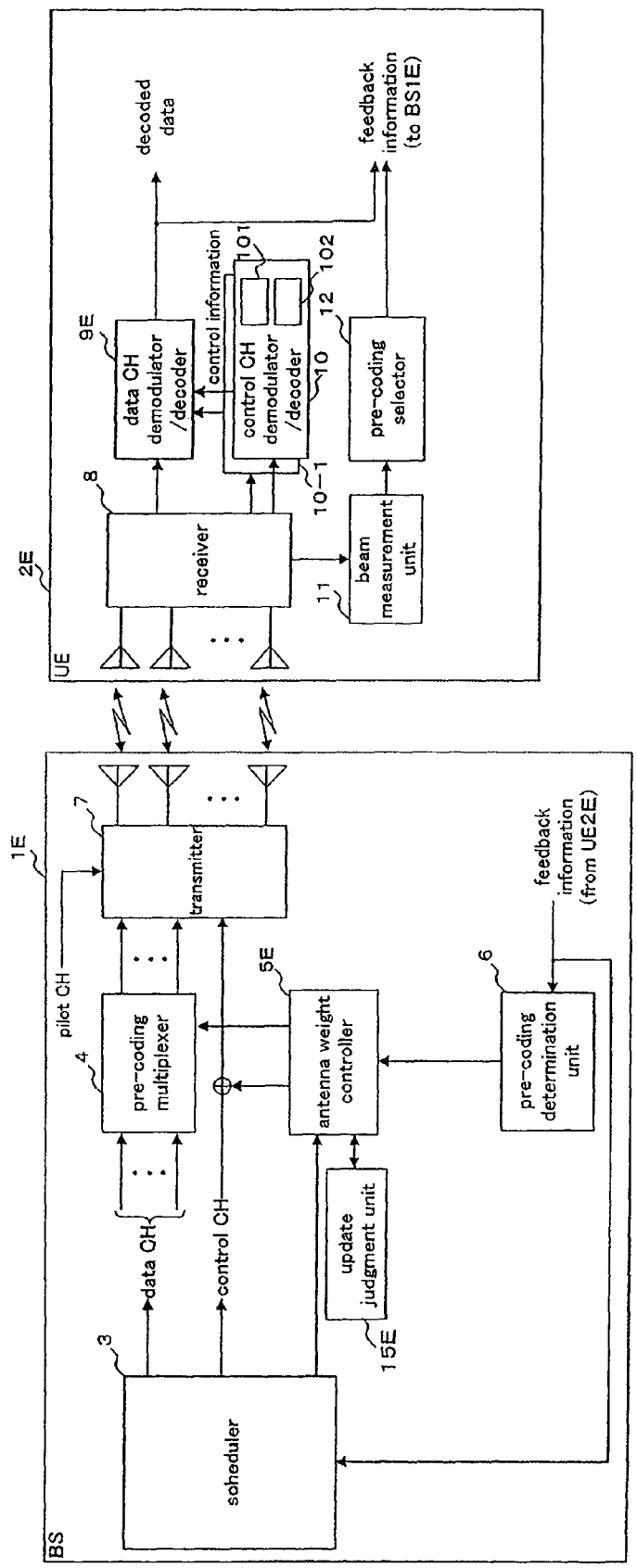
FIG. 12 is a block diagram illustrating an example of configuration of a radio communication system according to a sixth embodiment.

As illustrated in FIG. 12, the UE 2E in this example has a control CH modulator/decoder (first control CH modulator/decoder) 10-1 which can demodulate and decode a signal on the control CH containing antenna weight information, and a control CH demodulator/decoder (second control CH demodulator/decoder) 10-2 which can demodulate and decode a signal on the control CH not containing antenna weight information. In FIG. 12, like reference characters designate like or corresponding parts that have been described hereinbefore unless specifically mentioned.

Each of the first control CH demodulator/decoder 10-1 and the second control CH demodulator/decoder detects the length of a signal on the control CH to judge whether or not antenna weight information is contained in the control CH, for example.

For example, when antenna weight information is contained in the control CH, the length of a signal on the control CH is increased. When antenna weight information is not contained in the control CH, the length of a signal on the control channel is decreased.

When it is judged that antenna weight information (new antenna weight information) is contained in the control CH, the first control CH demodulator/decoder 10-1 demodulates and decodes a signal on the control CH to obtain the new antenna weight information. The first control CH demodulator/decoder 10-1 updates contents of the above-described memory 101 to the new antenna weight information, and the data CH demodulator/decoder 9E demodulates and decodes a signal on the data CH with the new antenna weight information.

On the other hand, when it is judged that antenna weight information is not contained in the control CH, the second control CH demodulator/decoder 10-2 obtains antenna weight information (old antenna weight information) already stored in the above-described memory 101, and the data CH demodulator/decoder 9E demodulates and decodes a signal on the data CH with the old antenna weight information.

As above, the UE 2E in this example autonomously judges presence/absence of update (transmission) of antenna weight information, and selectively uses new antenna weight information or old antenna weight information to demodulate and decode a signal on the data CH.

The BS 1E in this example need not set the notification CH, unlike the above fifth embodiment, to transmit information representing presence/absence of update. This embodiment can provide the same effects and advantages as the fifth embodiment, while reducing the information quantity in the DL addressed to the UE 2E as compared with the fifth embodiment.

In the above example, each of the first control CH demodulator/decoder 10-1 and the second control CH demodulator/decoder 10-2 detects the length of a signal on the control CH to judge whether or not antenna weight information is contained in the control CH. Alternatively, the BS 1E may insert indicator information representing presence/absence of antenna weight information into the control CH and transmit the same, and the first control CH demodulator/decoder 10-1 and the second control CH demodulator/decoder 10-2 may detect presence/absence of the indicator to judge whether or not the antenna weight information is contained in the control CH.

By doing so, it becomes possible to provide the same effects and advantages as the fifth embodiment without setting the notification CH, and judge presence/absence of update of antenna weight information by the UE 2E even when another data is loaded in a vacant portion on the control CH.

In the above example, the UE 2E has the first control CH demodulator/decoder 10-1 and the second control CH demodulator/decoder 10-2, separately. Alternatively, a common control CH demodulator/decoder 10 may have the above judgment function.

(2.7) Seventh Embodiment

The BS 1F in this example can generate pattern information of RBs associated with antenna weight information to be transmitted, and notify the UE 2F of the pattern information.

Figure 13:
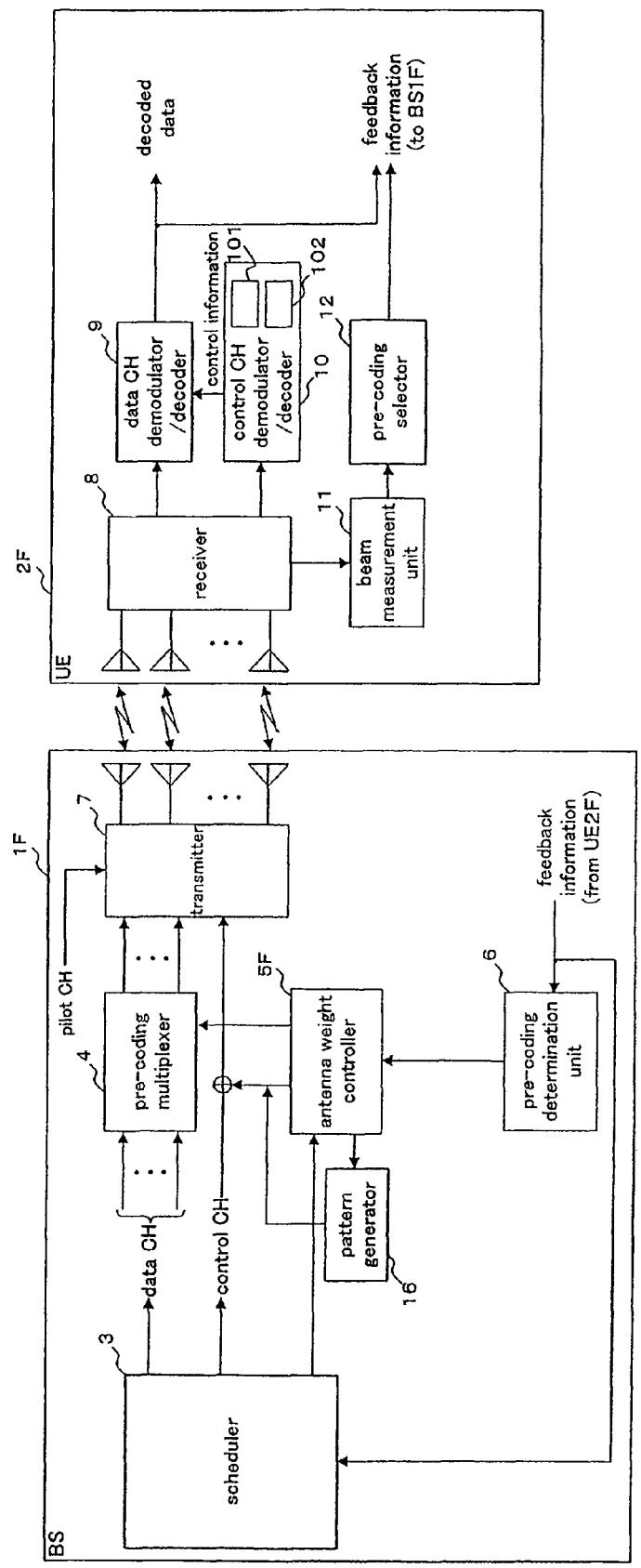
FIG. 13 is a block diagram illustrating an example of configuration of a radio communication system according to a seventh embodiment.

The BS 1F in such case has a pattern generator 16 which generates transmission pattern information about RBs associated with antenna weight information to be transmitted by the antenna weight controller 5F, and multiplexes the transmission pattern information onto a signal (antenna weight information) on the control CH, as illustrated in FIG. 13. Incidentally, like reference characters in FIG. 13 designate like or corresponding parts that have been described hereinbefore unless specifically mentioned.

When the transmission pattern information is defined to be of two bits, for example, the transmission pattern of RBs associated with antenna weight information to be transmitted in one sub-frame can be expressed in four types, as disclosed below.

pattern information "00": RB#0, RB#4, RB#8, . . . and RB#96 pattern information "01": RB#1, RB#5, RB#9, . . . , and RB#97 pattern information "10": RB#2, RB#6, RB#10, . . . , and RB#98 pattern information "11": RB#3, RB#7, RB#11, . . . , and RB#99

The above transmission pattern information can be notified to the UE 2F by using vacant bits or the like of a signal on the control CH.

The UE 2F can identify a transmission pattern of RBs whose antenna weight information is to be transmitted from the BS 1F by receiving the above transmission pattern information to appropriately receive and process (update) antenna weight information associated with RBs.

Since the BS 1F in this example can notify the UE 2F of a transmission pattern of RBs associated with antenna weight information to be transmitted over the existing control CH or the like, it is possible to implement the above embodiments without largely changing the apparatus configurations of the BS 1F and the UE 2F.

Note that the above pattern information is merely an example, not limited to the above.

Further, the number of bits of the transmission pattern information may be appropriately changed.

(3) Others

The functions provided to the above BS 1, 1A to 1F and UE 2, 2A to 2F may be chosen variously as necessary, or may be suitably combined.

The BS 1, 1A to 1F may take an UE 2, 2A to 2F not selected by the scheduler 3 (an RB not allocated the data CH) into the group of antenna weight information in the above method.

Further, the BS 1, 1A to 1F may obtain quality information about the radio propagation path between the BS 1, 1A to 1F and the UE 2, 2A to 2F, and switch the above operations on the basis of the obtained quality information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

The invention claimed is:

1. A radio base station having radio communication with a radio terminal via a plurality of transmitting antennas, the radio base station comprising:
    a transmitter that multiplies data to be transmitted from the transmitting antennas in each of a plurality of resource blocks obtained by dividing a radio resource used for the radio communication with the radio terminal by a piece of weight information, transmits the data to the radio terminal via a first channel, and notifies the radio terminal of the piece of weight information via a second channel different from the first channel; and
    a controller that controls a group, which is the group of a part of all pieces of the weight information, of plural pieces of the weight information to be notified, the plural pieces of the weight information associated with resource blocks to be transmitted in a unit time period.

2. The radio base station according to claim 1, wherein the controller selects other pieces of the weight information as the group in each of a unit time period.

3. The radio base station according to claim 2, wherein the controller selects plural pieces of the weight information forming the group according to a predetermined rule.

4. The radio base station according to claim 2, wherein the controller selects plural pieces of the weight information as the group in each of the unit time period when the number of times the weight information is updated according to propagation path environments between the radio base station and the radio terminal or a ratio of updated weight information is below a predetermined threshold value.

5. The radio base station according to claim 3, wherein the controller selects plural pieces of the weight information as the group in each of the unit time period when the number of times the weight information is updated according to propagation path environments between the radio base station and the radio terminal or a ratio of updated weight information is below a predetermined threshold value.

6. The radio base station according to claim 1, wherein the controller selects all pieces of the weight information as the group when the number of times the weight information is updated according to propagation path environments between the radio base station and the radio terminal or a ratio of updated weight information is equal to or larger than a predetermined threshold value.

7. The radio base station according to claim 1, wherein the controller selects all pieces of the weight information as the group when receiving a call setting request from the radio terminal.

8. The radio base station according to claim 1, wherein the controller selects all pieces of the weight information as the group when any one piece of the weight information is updated.

9. The radio base station according to claim 8, wherein the controller notifies the radio terminal of presence/absence of the update.

10. The radio base station according to claim 1, wherein the controller notifies the radio terminal of a relation between weight information to be transmitted to the radio terminal and resource blocks by using predetermined pattern information.

11. The radio base station according to claim 1, wherein the controller takes a piece of weight information associated with a resource block not allocated to the radio terminal into the group.

12. A radio terminal receiving via a plurality of receiving antennas a transmission signal transmitted from a radio base station via a plurality of transmitting antennas, the radio terminal comprising:
    a demodulating and decoding unit that receives a signal containing a piece of weight information transmitted via the transmitting antennas in each of a plurality of resource blocks obtained by dividing a radio resource used for communication with the radio base station, and obtaining the weight information from the received signal;
    a storing unit that stores each piece of the weight information associated with a relevant resource block; and
    an updating unit that updates a piece of the stored weight information associated with a relevant resource block corresponding to the received piece of weight information, wherein
    a group of the pieces of the weight information received is controlled by the radio base station, wherein
    the radio base station comprises:
        a transmitter that multiplies data to be transmitted from the transmitting antennas in each of a plurality of resource blocks obtained by dividing a radio resource used for the radio communication with the radio terminal by a piece of weight information, transmits the data to the radio terminal via a first channel, and notifies the radio terminal of the piece of weight information via a second channel different from the first channel; and
        a controller that controls a group, which is the group of a part of all pieces of the weight information, of plural pieces of the weight information to be notified, the plural pieces of the weight information associated with resource blocks to be transmitted in a unit time period.

13. A radio communication method in a communication system comprising a radio terminal and a radio base station communicating with the radio terminal via a plurality of transmitting antennas, the radio communication method comprising:
    by the radio base station,
    multiplying data to be transmitted via the transmitting antennas in each of a plurality of resource blocks obtained by dividing a radio resource used for communication with the radio terminal by a piece of weight information;
    transmitting the data to the radio terminal via a first channel;
    notifying the radio terminal of the piece of weight information via a second channel different from the first channel; and
    controlling a group, which is the group of a part of all pieces of the weight information, of plural pieces of the weight information to be notified, the plural pieces of the weight information associated with resource blocks to be transmitted in a unit time period.

14. The radio communication method according to claim 13, wherein other pieces of the weight information is selected as the group in each of a unit time period by the radio base station.

15. The radio communication method according to claim 14, wherein plural pieces of the weight information forming the group is selected according to a predetermined rule by the radio base station.

16. The radio communication method according to claim 14, wherein plural pieces of the weight information is selected as the group in each of the unit time period by the radio base station when the number of times the weight information is updated according to propagation path environments between the radio base station and the radio terminal or a ratio of updated weight information is below a predetermined threshold value.

17. The radio communication method according to claim 15, wherein plural pieces of the weight information is selected as the group in each of the unit time period by the radio base station when the number of times the weight information is updated according to propagation path environments between the radio base station and the radio terminal or a ratio of updated weight information is below a predetermined threshold value.

18. The radio communication method according to claim 13, wherein all pieces of the weight information is selected as the group by the radio base station when the number of times the weight information is updated according to propagation path environments between the radio base station and the radio terminal or a ratio of updated weight information is equal to or larger than a predetermined threshold value.

* * * * *